United States Patent [19]

Tani et al.

[11] Patent Number: 5,198,064
[45] Date of Patent: Mar. 30, 1993

[54] PROCESS FOR PREPARING A PERMEABLE ADHESIVE TAPE

[75] Inventors: Naoyuki Tani, Hiranomiya; Kusutaro Yoshida, Sakai, both of Japan

[73] Assignee: Sankyo Chemical Co., Ltd., Osaka, Japan

[21] Appl. No.: 520,458

[22] Filed: May 8, 1990

[30] Foreign Application Priority Data

May 10, 1989 [JP] Japan .................................. 1-118276

[51] Int. Cl.$^5$ ........................ B05D 5/10; A61L 15/00
[52] U.S. Cl. ..................................... 156/289; 156/77; 156/231; 156/238; 427/208.4; 427/243; 428/355; 602/903
[58] Field of Search .................. 427/207.1, 208.4, 243, 427/245, 246; 128/156; 156/77, 289, 230, 231, 238, 247; 524/475; 428/351, 352, 355, 356

[56] References Cited

U.S. PATENT DOCUMENTS

| | | | |
|---|---|---|---|
| 2,415,901 | 2/1947 | Nelson et al. | 128/156 |
| 2,884,126 | 4/1959 | Ulrich | 128/156 |
| 3,121,021 | 2/1964 | Copeland . | |
| 3,532,652 | 10/1970 | Zang et al. | 156/230 |
| 3,789,027 | 1/1974 | Traubel et al. . | |
| 3,920,588 | 11/1975 | Traubel et al. . | |
| 3,968,293 | 7/1976 | Cunningham et al. | 427/246 |
| 3,979,532 | 9/1976 | Muck et al. | 427/245 |
| 4,029,534 | 6/1977 | Bocks et al. | 156/247 |
| 4,082,705 | 4/1978 | Beede et al. | 427/208.4 |
| 4,146,027 | 3/1979 | Hoey | 128/156 |
| 4,163,822 | 8/1979 | Walter | 156/77 |
| 4,207,128 | 6/1980 | Traubel et al. | 156/77 |
| 4,436,839 | 3/1984 | Behnke et al. | 521/64 |
| 4,559,369 | 12/1985 | Bauman et al. | 521/98 |
| 4,663,358 | 5/1987 | Hyon et al. | 521/64 |
| 4,749,590 | 6/1988 | Klingen et al. | 427/208.4 |
| 4,789,413 | 12/1988 | Tani et al. . | |
| 4,910,097 | 3/1990 | Nomura | 427/388.4 |

FOREIGN PATENT DOCUMENTS 51-33811 3/1976 Japan .
57-182375 11/1982 Japan .

*Primary Examiner*—Michael W. Ball
*Assistant Examiner*—Daniel J. Stemmer
*Attorney, Agent, or Firm*—Sandler Greenblum & Bernstein

[57] ABSTRACT

Process for preparing a permeable adhesive tape which comprises;

preparing a dispersion comprising, as a dispersion medium, an organic solvent solution containing a natural or synthetic rubber and/or acrylic pressure sensitive adhesive agent and a polyfunctional isocyanate compound, and at least water and hydrophobic inorganic fine particles and optionally a water absorptive high molecular weight compound dispersed in the organic solvent solution, applying the dispersion directly onto a porous material or impregnating the porous material with the dispersion, thereafter the dispersion-applied or impregnated porous material being dried by heating; or spplying the dispersion onto a releasing sheet, heat drying the dispersion-applied sheet and laminating a porous material on the dispersion-applied surface thereof, thereby providing the permeable adhesive tape in which the permeable adhesive layer and the porous material are integrated.

22 Claims, No Drawings

PROCESS FOR PREPARING A PERMEABLE ADHESIVE TAPE

BACKGROUND OF THE INVENTION

1. Field of the Invention

The present invention relates to a process for preparing a permeable adhesive tape. More specifically, the present invention relates to an industrially advantageous process for preparing a permeable adhesive tape which comprises making holes with the aid of water, or water and absorptive high-molecular weight compound.

2. Description of the Related Art

The present invention is specifically directed to adhesive tapes used for protecting wounds or others. By way of example, the adhesive tapes referred to herein are meant to include adhesive bandages, sticking plasters and bandages, surgical cloths. Such adhesive tapes cause a rash when adhered and maintained on skin for a long time. For avoiding this problem, it is desirous that tapes have permeability. In order to solve this problem, it is known to form holes in tapes by using the following hole forming methods:

(i) mechanically, for instance, by punching the product;

(ii) chemically, for instance, by incorporating a substance which can be leached out by a solvent from the product;

(iii) physically, for instance, by causing the product to foam by expelling a solvent during drying, thus making the material microporous; and (iv) by physical interaction between the backing material and the adhesive, for example, by allowing the adhesive to dry in contact with a fabric backing material which causes the adhesive to become porous.

Examples of known products classified in (iii) are "Micropore" (trademark of 3M in USA), and tapes disclosed in Japanese Unexamined Patent Publication No. 57(1982)-182375 and the like. For instance, the above No. 57(1982)-182375 discloses that an adhesive layer is formed by using a dispersion of an adhesive agent in an organic solvent, and is given for permeability therein.

In this regard, a process for conveniently and efficiently preparing an adhesive tape having high permeability is disclosed in U.S. Pat. No. 4,789,413 which comprises dispersing water, or water and a water absorptive high-molecular weight compound homogeneously in a solution of a natural or synthetic rubber or acrylic pressure sensitive adhesive agent in an organic solvent, applying the dispersion onto a releasing agent applied sheet, drying the adhesive agent applied sheet, and laminating a porous material on the adhesive agent applied surface to obtain a permeable adhesive tape. This process will hereinafter be termed as the "water dispersion method".

The present invention is to improve the above water dispersion method. Particularly, this invention is to provide a permeable adhesive tape incorporating an adhesive layer being improved in both its tenacity after adhering to an object (breaking strength) and its adhesion to a porous material (peel strength).

A generally known method to improve a pressure sensitive adhesive agent in tenacity is adding an isocyanate crosslinker to the pressure sensitive agent in such an amount as not to hinder the adhesion thereof. Therefore, with the above water dispersion method, an adhesive layer, is formed by using a modified dispersion containing an isocyanate crosslinker which is specifically prepared by adding the crosslinker to the organic solution of a pressure sensitive adhesive agent used as a dispersion medium of the above dispersion.

In this case, however, the added isocyanate crosslinker reacts with water coexisting therewith to gelate the dispersion, so that homogeneous application, or application itself of the dispersion, becomes impossible. That results in difficulty in forming the adhesive layer.

To avoid this gelation, adding the isocyanate crosslinker to the dispersion just before the application can be theoretically inferred. Even in this situation, however, the added isocyanate crosslinker is consumed by reacting with water, with the result that it is still difficult to sufficiently improve tenacity and adhesion to the porous material.

SUMMARY OF THE INVENTION

Intensive research has been conducted and it has been found that adding hydrophobic inorganic fine particles to the dispersion in the above water dispersion method, while adding a required amount of the isocyanate crosslinker, makes it possible to solve the abovementioned problems.

Accordingly, the present invention provides a process for preparing a permeable adhesive tape which comprises; preparing a dispersion comprising, as a dispersion medium, an organic solvent solution containing a natural or synthetic rubber and/or acrylic pressure sensitive adhesive agent and a polyfunctional isocyanate compound, and at least water and hydrophobic inorganic fine particles dispersed in the organic solvent solution, applying the dispersior directly onto a porous material or impregnating porous material with dispersion, thereafter the dispersion-applied or impregnated porous material being dried by heating; or applying the dispersion onto a releasing sheet, heat drying the dispersion-applied sheet and laminating a porous material on the dispersion-applied surface thereof, thereby providing the permeable adhesive tape in which the permeable adhesive layer and the porous material are integrated.

DESCRIPTION OF THE PREFERRED EMBODIMENT

The term "permeable" as used in this invention means the ability to to permeate gas, as well as water. Water can generally be permeated under a slight pressure. Its extent can be measured in accordance with JIS P8117, "Test method for permeability for paper and board paper", which is expressed as average seconds required to pass 300 ml of air through a test tape having 645 $mm^2$.

The adhesive agent employed in the invention is a natural or synthetic rubber or acrylic pressure sensitive adhesive agent and may be any one which can be used in the art.

The pressure sensitive adhesive agent employed in the invention is available as that contained or dissolved in an organic solvent. A specific organic solvent is a hydrophobic organic solvent such as ethyl acetate, benzene, toluene, xylene, hexane, mineral oil, petroleum ether or the like, or a mixture of two or more of these solvents. These organic solvent solutions act as dispersion media of the dispersion used in the invention. Besides the above solvent, another or other solvents not lowering the effects of the invention may be added thereto.

Also, the adhesive agent may incorporate one or more kinds of tackifier, plasticizer, antioxidant, medicine or preservative.

In the present invention, the amount of water dispersed in the above dispersion medium is suitably 5-60 parts by weight, preferably 10-50 parts by weight parts to the organic solvent solution (100 parts by weight) of a rubber pressure sensitive adhesive agent, and 5-50 parts by weight, preferably 5-40 parts by weight to the solution of an acrylic pressure sensitive adhesive agent.

Also in the present invention, water absorptive highmolecular weight compound may be dispersed in addition to water. "Water absorptive high-molecular weight compound" as used in the invention means one which can swell upon the absorption of water in a quantity from several hundred folds to four folds of the highmolecular weight compound's own weight, without dissolving in water, and wherein water may be separated from the swollen product under pressure. Examples of these compounds starches, starch-acrylonitrile graft polymer, starch-acrylic acid graft polymer, starch-styrenesulfonic acid graft polymer, starch-vinylsulfonic acid graft polymer and the like; celluloses, celluloseacrylonitrile graft polymer, cellulose-styrenesulfonic acid graft polymer, crosslinked polymer of carboxymethylcellulose and the like; polyvinylalcohols, polyvinylalcohol-crosslinked polymer, polyacryl-vinylacetate saponified product and the like; acrylates, polyacrylate crosslinked product, polyacrylonitrile polymer saponified product and the like; polyethyleneoxides, polyethyleneglycoldiacrylate crosslinked polymer and the like; and other polymers containing a carboxyl group, carboxylic acid salt group, hydroxy group or sulfonic acid group, or a polyvinylpyrolidone crosslinked polymer.

Usage of the water absorptive high-molecular weight compound is 1/3000 to 1/10 parts by weight for water, preferably, 1/600 to 1/20 parts by weight for water. The particle size of the water absorptive high-molecular weight compound is suitably less than 60 $\mu$m, preferably less than 40 $\mu$m, because smaller particles are easier to disperse in water.

The most characteristic feature of the invention exists in that a polyfunctional isocyanate compound (isocyanate crosslinker) is contained in the organic dispersion of water (optionally with the water absorptive high molecular weight compound) while at the same time hydrophobic inorganic fine particles are dispersed therein.

The polyfunctional isocyanate compound used in the invention may be a non-polymeric compound or a socalled prepolymer provided that it has at least two isocyanate groups for crosslinking. Examples of the polyfunctional isocyanate compound are tolylene diisocyanate (TDI), diphenylmethane diisocyanate (MDI), tolidine diisocyanate (TODI), xylidine diisocyanate (XDI), hexamethylene diisocyanate (HMDI), trimethylolpropane(TMP)-TDI adduct, polyfunctional aromatic polyisocyanate (polymeric compound of TDI, or the like), polymethylene polyphenyl isocyanate and the like, and partially modified compounds of these. Among them, it is preferable to use TDI-TMP adduct or polymethylene polyphenyl isocyanate.

On the other hand, as the hydrophobic inorganic fine particles, inorganic granules are used at least whose surfaces are hydrophobic. For instance, they may be particles of a metallic oxide such as silica, alumina, titania, or the like whose surfaces are associated with hydrocarbon groups, silicon-compound residues, fluorine-compound residues or the like to improve the hydrophobic nature of the surfaces. The average diameter of the fine particles is suitably 10 $\mu$m or less, and, in particular 7 nm to 3 $\mu$m. Particles being greater than 10 $\mu$m in average diameter are not suitable for this invention because they make the adhesive layer uneven in thickness or deteriorate the smoothness of the surface thereof. Preferable examples of such hydrophobic inorganic fine particles are those of silicon oxide (silica) whose surfaces are combined with hydrophobic nature imparting groups such as methyl groups, trimethylsilyl groups, octylsilyl groups, polyorganosiloxane groups, or the like, or those of silicon oxide (silica) whose surfaces are coated with silicone oil, and the like. For instance, fine particles available with the name of "Hydrophobic Silica" or "AEROSIL" may be used.

Adding the polyfunctional isocyanate compound and dispersing the hydrophobic inorganic fine particles may be carried out after or before dispersing water in the organic solvent solution of an adhesive agent. Addition of the isocyanate compound and the inorganic fine particles to the solution may be simultaneously or separately carried out. In either case, it is suitable to add, into the water-dispersed organic solvent solution or the organic solvent solution of an adhesive agent, the isocyanate compound and/or the inorganic fine particles by incorporating the solution and/or suspended liquid thereof in a hydrophobic organic solvent which is identical to or compatible with the above solution.

The amount of the polyfunctional isocyanate compound is suitably 0.01-40 parts by weight to 100 parts by weight of the pressure sensitive adhesive agent (solid content) in the dispersion, preferably 0.01-25 parts by weight thereto. More than 40 parts by weight of the compound causes too much crosslinking so that the setting nature is too enhanced to yield a desirable adhesion. As well, less than 0.01 parts by weight of the compound does not sufficiently enhance the tenacity of the adhesive layer and the adhesion thereof to the backing material.

On the other side, the amount of the hydrophobic inorganic fine particles to be dispersed is suitably 1-500 wt %, preferably 5-300 wt % relative to the amount of NCO (isocyanate radical) in above the isocyanate compound, and suitably 0.01-100 wt %, preferably 0.1-60 wt % relative to the amount in weight of the isocyanate compound (solid content). Too many fine particles cause the dispersion to undesirably increase in viscosity so that unevenness of coating or a decrease in adhesion thereof occurs. As well, too few fine particles cannot sufficiently restrain or prevent the reaction of the isocyanate compound with water, with the result that the abovementioned gelation occurs or the tenacity and the adhesion to the backing material cannot be sufficiently enhanced.

In the present invention, integration of the permeable adhesive layer and porous material is performed by directly applying the above dispersion in an organic solvent containing water, hydrophobic inorganic fine particles, pressure sensitive adhesive agent, polyfunctional isocyanate compound, and optional water absorptive high-molecular weight compound onto the porous material or impregnating the porous material with the above dispersion and thereafter subjecting it to heat drying, or by applying the dispersion onto the releasing sheet, heat drying it, and thereafter laminating the porous material on the dispersion-applied surface thereof.

As the porous material, a known backing material for various tapes, such as cellulosic paper, or non-woven fabric, and rough-mesh polymer or polymer foam may be used provided that it does not deteriorate the permeability.

As the releasing sheet, a releasing agent applied sheet such as silicone applied paper, silicone applied film, or the like may be used.

The amount of the dispersion to be applied or impregnated is such as to form the adhesive layer of a desired thickness because the permeability thereof can hardly depend on the thickness of the adhesive layer. Commonly used methods may be adopted to apply the adhesive agent.

In the drying step after the application or impregnation of the adhesive agent, a conventional multistage zone drier is used, for example, at a temperature of 40°–140° C. However, any other drying apparatus may also, be used. The residence time is suitably 3–10 minutes.

Impregnation of the porous material with the dispersion can be easily performed by dipping, whereby a so-called double-sided adhesive tape having adhesive layers on both sides of the porous material can be efficiently manufactured. The double-sided adhesive tape can also be manufactured by applying the dispersion onto one side thereafter the other side of the porous material. Moreover, the double sided adhesive tape can be manufactured by obtaining an adhesive tape with an adhesive layer on one side and a releasing sheet on the other side of the porous material, thereafter releasing the releasing sheet from the porous material and forming an adhesive layer on the released side of the porous material.

In industrial manufacturing, tapes obtained utilizing a releasing sheet are usually wound up into a roll or cut down into sheets, with the releasing sheet still laminated. When tapes obtained not utilizing or releasing sheet are stored in the form wound into a roll, it is desirable to use a backing material to which previous coating with a releasing agent is performed, or to apply a protecting material (for example, a releasing sheet whose one or both sides are coated with a releasing agent) onto the adhesive layer, so that the adhesive agent cannot adhere to the adjacent backing material. The final tapes may be sterilized by radiation or other means.

By adding and dispersing water, or water and a water absorptive high-molecular weight compound in an organic solvent solution of the pressure sensitive adhesive agent and applying the obtained dispersion onto a releasing sheet or a porous material or impregnating the porous material with the dispersion, a discontinuous coating film comprising the pressure sensitive adhesive agent in which water and/or high molecular weight compound swollen with water is dispersed is obtained. In the following drying step, that is, when the organic solvent is removed to form the adhesive layer, the water and/or the high molecular weight compound swollen with water prevents fusing and adhering of the adhesive agent and holes are formed at positions where the water has intervened.

The polyfunctional isocyanate compound contained in the dispersion reacts in the above heat drying process mostly with rubber molecules or acrylic polymers constituting the adhesive layer for enhancing the tenacity (breaking strength) thereof, while the remainder of the compound reacts gradually with functional groups such as OH groups, NH$_2$ groups, COOH groups, or the like contained in the porous material for enhancing the adhesion between the porous material and the adhesive layer.

On the other side, hydrophobic inorganic fine particles cover with regular orientations the surface of water or high molecular weight compound swollen with water dispersed in in the dispersion to inhibit or delay the reaction of the isocyanate compound with water. This results in the reaction of the isocyanate compound with water being inhibited or restrained to prevent gelation of the dispersion or wasteful consumption of the isocyanate compound.

EXAMPLES

Example 1

A preparation consisting of 29.0 parts by weight of 2-ethylhexyl acrylate, 8.1 parts by weight of butyl acrylate, 2.5 parts by weight of hydroxylethyl acrylate, 0.5 parts by weight of acrylic acid, 0.06 parts by weight of benzoylperoxide, and 58.0 parts by weight of ethyl acetate was subjected to polymerization in a nitrogen stream using a conventional polymerization technique to yield an acrylic pressure sensitive adhesive agent in a solution form.

20 parts by weight of water was admixed with 100 parts by weight of the ethyl acetate solution of the acrylic pressure sensitive adhesive agent (40 weight %) to yield dispersion A in which the water was dispersed.

On the other hand, as a source of the polyfunctional isocyanate compound, there was used CORONATE L-55E [a product of NIPPON POLYURETHANE INDUSTRY Co., Ltd.; 55 weight % of TMP-TDI adduct (9.5 weight % of its NCO) in the form of a solution in ethyl acetate], to which AEROSIL R-972 [a product of NIPPON AEROSIL Ltd. (fine particles of silica whose individual surfaces was rendered hydrophobic with CH$_3$; their average diameter: 16 nm; their specific surface area: 110±20 m$^2$/g) was added as the hydrophobic inorganic fine particles to yield the following source liquids 1–4 of isocyanate/inorganic fine particles, which are shown in Table 1.

TABLE 1

| Source liquid | 1 | 2 | 3 | 4 |
|---|---|---|---|---|
| CORONATE L-55E (in parts by weight) | 100 | 100 | 100 | 100 |
| AEROSIL R-972 (in parts by weight) | 0 | 2 | 10 | 20 |

Next, 1.5 parts by weight of each of the above source liquids 1–4 was admixed with 100 parts by weight of the above dispersion A to yield corresponding preparations 1–4 to be applied or impregnated.

These preparations were tested for viscosity variation with time at a temperature of 40° C. The following table shows the result of the test in the units of CPS.

TABLE 2

| | 0 | ½ h. | 1 h. | 2 h. | 3 h. | 4 h. |
|---|---|---|---|---|---|---|
| Preparation 1 (comparative) | 5500 | 25000 | gelated | — | — | — |
| Preparation 2 | 5500 | 6000 | 10000 | 13000 | 18000 | gelated |
| Preparation 3 | 5800 | 5500 | 5800 | 6100 | 6900 | 20500 |
| Preparation 4 | 6000 | 6000 | 6500 | 6500 | 6500 | 7800 |

It can be understood from TABLE 2 that the preparations 2–3 containing hydrophobic inorganic fine particles delayed its gelation considerably compared with the comparative preparation not containing the fine particles. The preparation 4 in particular maintained suitable viscosity for application or impregnation even after 4 hours.

Example 2

A predetermined amount of source liquid B of isocyanate/inorganic fine particles in which above AEROSIL R-972 (hydrophobic inorganic fine particles) was admixed with above CORONATE L55-E (polyfunctional isocyanate) was added to 100 parts by weight of an acrylic adhesive agent of an organic solvent type [RIKIDYNE AR-2010 (product of Sankyo Chemical Co., Ltd.); solid content: 40 weight %; solvent: toluene/ethyl acetate]. Subsequently, predetermined amounts of an aqueous solution of a water absorptive high molecular weight compound [SANWET IM-1000MPS (a product of Sanyo Chemical Industries, Ltd.): 0.5 parts by weight water: 30 weight parts] were admixed with and dispersed in the above mixture to yield slurry products for application or impregnation of the following compositions.

Each of these slurry products was applied onto silicone applied releasing paper by means of comma coater to a swollen thickness of 110–120 μm, and passed through a multistage zone dryer at a staying time of 3–10 minutes to have a dried adhesive layer of approximately 35 μm thick with less than 1% of the remaining solvent Immediately after the drying, a non-woven fabric [SONTARA8010; a product of Toray Du Pont Company] was laminated on and made to adhere tightly to each adhesive layer to yield an adhesive tape product.

These products were left to stand for a week, thereafter measurement was carried out with respect to permeability thereof and various properties of the adhesive layers thereof. This measurement was performed in accordance with JIS-Z0237, JIS-P8117.

The same measurement was performed with respect to comparative examples in which an aluminum crosslinker [ORGATIX AL-80 (a product of Matsumoto Trading Co., Ltd.)] was used instead of the above source liquid of isocyanate/inorganic fine particles. TABLE 3 shows the results of the above measurements.

Example 3

A rubber adhesive agent of the following composition was used:

| | |
|---|---|
| Natural rubber | 15.0 parts by weight |
| Block copolymer (stylene-isoprene-stylene) | 4.0 parts by weight |
| Terpene resin (mp. 115° C.) | 4.0 parts by weight |
| Petroleum resin (mp. 80° C.) | 16.0 parts by weight |
| Polybutene | 1.0 parts by weight |
| 2,6-di-tert-butylparacresol (anti-aging agent) | 0.1 parts by weight |
| Toluene | 60.0 parts by weight |

31 parts by weight of a dispersion of water absorptive high-molecular weight compound and water [SANWET IM-1000MPS: 1.0 parts by weight; water: 30 weight parts] was admixed with 100 parts by weight of the above rubber adhesive agent (40 weight %) to yield a dispersion.

Alternatively, MILLIONATE MR-100 [polymethylene polyphenyl isocyanate (31 weight % of NCO was contained) was used as a polyfunctional isocyanate source, to which AEROSIL R-972 (hydrophobic inorganic fine particles) was added to yield the following source liquids 8–10 of isocyanate/inorganic fine particles.

TABLE 4

| Source liquid | 7 | 8 | 9 | 10 |
|---|---|---|---|---|
| MILLIONATE MR-100 | 100 | 100 | 100 | 100 |
| AEROSIL R-972 | 0 | 3 | 6 | 12 |

Subsequently, 2.0 parts by weight of each of the above source liquids 8–10 was admixed with 131 parts by weight of the above dispersion to yield corresponding three preparations 8–10 for application or impregnation.

These preparations were tested for their viscosity variation with time at a temperature below 25° C. in units of CPS.

TABLE 5

| | 0 | ½ h. | 1 h. | 4 h. | 8 h. |
|---|---|---|---|---|---|
| Preparation 7 (comparative) | 26000 | 26000 | 30000 | 48000 | gelated |
| Preparation 8 | 28000 | 28000 | 30000 | 50000 | 92000 |
| Preparation 9 | 28000 | 28000 | 30000 | 41000 | 50000 |
| Preparation 10 | 30000 | 30000 | 30000 | 35000 | 40000 |

As seen from TABLE 5, the preparations 8–10 containing hydrophobic inorganic fine particles delayed

TABLE 3

| preparation | Dispersion of water absorptive high-molecular weight compound and water (in parts by weight) | Aluminum crosslinker (in parts by weight) | Source liquid B of isocyanate/inorganic fine particles (in parts by weight) | Adhesion (g/20 mm width) | Tenacity (minutes) (40° C. × 300 g) | Permeability (seconds/300 ml) |
|---|---|---|---|---|---|---|
| Examples | | | | | | |
| 5 | 15 | 0 | 2.2 | 575 | Non-Creep(NC)/1440 | 64 |
| 6 | 30 | 0 | 2.2 | 840 | NC/1440 | 2.5 |
| Comparative Examples | | | | | | |
| (a) | 0 | 1.5 | 0 | 530 | 590 broken near the interface | 699 |
| (b) | 31 | 1.5 | 0 | 725 | 408 broken near the interface | 3 |
| (c) | 0 | 0 | 2.2 | 625 | NC/1440 | 1930 | their gelation considerably in comparison with the preparation 7 not containing the same.

In the same manner as in Example 2, adhesive tapes were manufactured and their properties were measured. TABLE 6 shows conditions and results of the measurement.

In TABLE 6, source liquid C consists of 100 parts by weight of CORONATE L-55E, 1.5 parts by weight of AEROSIL R-972, and 250 parts by weight of ethyl acetate, and source liquid C is of isocyanate/inorganic fine particles consisting of 25 weight parts of MILLIONATE MR-100 [polymethylene polyphenyl isocyanate (NCO 31 weight %)], 15 weight parts of AEROSIL R-972, and 60 parts by weight of toluene. In addition, "ENDURA" (a product of WR. GRACE) denotes a backing material.

even in an actual manufacturing process. Therefore, the invention is very useful for a practical purpose.

Still further, adhesive tapes obtained by the invention can enjoy the following advantages:

1. Decreasing considerably a rash or inflammation with the help of its permeability when applied onto skin;
2. Capable of being used as a tape of percutaneous absorption treatment (a tape like a sticking plaster impregnated with a liniment to be absorbed through skin);
3. Permitting air to pass through from the inner side and preventing water from penetrating from outside when combined with an air permeable film;
4. Capable of being applied to an object generating gas (for example, when the adhesive tape combined with a permeable film is applied onto a gas-generating object such as a plastic upon molded or the like, this

TABLE 6

| rubber adhesive agent | Dispersion of water absorptive high-molecular weight compound and water (in parts by weight) | Aluminum crosslinker (in parts by weight) | Source liquid C of isocyanate/inorganic fine particles (in parts by weight) | Source liquid D of isocyanate/inorganic fine particles (in parts by weight) | Results | | |
|---|---|---|---|---|---|---|---|
| | | | | | Adhesion (g/20 mm width) | Tenacity (minutes) (40° C. × 300 g) | Permeability (seconds/300 ml) |
| Comparative Examples | | | | | | | |
| 100 | 0 | — | — | — | 1210 | 28 Cohesion Failure (CF) | more than 80 thousands |
| 100 | 0 | — | 10 | — | 950 | 60 CF | more than 80 thousands |
| 100 | 0 | — | — | 4 | 910 | NC/1440 | more than 80 thousands |
| 100 | 31 | — | — | — | 1295 | 17 CF | 262 |
| 100 | 31 | 5 | — | — | 1015 | 55 CF | 43 |
| Examples | | | | | | | |
| 100 | 31 | — | 10 | — | 925 | 55 CF | 132 |
| 100 | 31 | — | — | 4 | 1100 | NC/1440 | 155 |

As can be understood from TABLE 6, the process of the invention can efficiently manufacture an adhesive tape highly improved in its tenacity, adhesion, and permeability.

Example 4

Direct application was performed using preparation 6 and preparation (c) as used in Example 2.

Each of the above preparations was directly applied onto Japanese paper (14 g/m²) to a swollen thickness of 110–120 μm. Thereafter, drying was performed at approximately 80° C. for 3 minutes to have an adhesive layer of approximately 45 μm thick. Permeability of each adhesive tape thus obtained was measured, and its result follows.

TABLE 7

| | adhesion (g/20 mm in width) | tenacity (min.) 40° C. × 300 g | permeability (sec./300 ml) |
|---|---|---|---|
| Preparation 6 | 500 | NC/1440 | 26 |
| Preparation (c) | 540 | NC/1440 | 1764 |

As can be recognized from the above Examples, the process of the present invention enabled to yield adhesive tapes having effective permeability irrespective of the application manner, direct or indirect.

According to the present invention, an adhesive tape having good permeability, adhesion, tenacity, and adherence to the porous material can be efficiently obtained by using the water dispersion method.

Further according to the invention, gelation by an isocyanate compound can be significantly restrained tape allows gas bubbles generated at the interface between the tape and the object to escape thereby to prevent poor adhesion).

5. Capable of being used for industrial purposes such as a double-sided adhesive tape and the like.

What is claimed is:

1. A process for preparing a permeable adhesive tape, comprising:
   preparing a dispersion, the dispersion containing (a) an organic solvent, (b) a member selected from the group consisting of a natural rubber pressure sensitive adhesive agent, a synthetic rubber pressure sensitive adhesive agent, and an acrylic pressure sensitive adhesive agent, (c) a polyfunctional isocyanate compound, (d) water, and (e) hydrophobic inorganic fine particles, the hydrophobic inorganic particles being present in the dispersion in an effective amount to restrain or prevent the reaction of the polyfunctional isocyanate compound with water; and
   applying said dispersion to a porous material.

2. The process according to claim 1, wherein said step of applying said dispersion to a porous material comprises applying said dispersion directly onto the porous material to obtain a dispersion-applied porous material, and drying the dispersion-applied porous material.

3. The process according to claim 1, wherein said step of applying said dispersion to a porous material comprises impregnating said dispersion directly into the porous material to obtain an impregnated porous material, and drying the impregnated porous material.

4. The process according to claim 1, wherein said step of applying said dispersion to a porous material comprises applying said dispersion onto a releasing sheet to obtain a dispersion-applied sheet having a dispersion-applied surface, heat drying said dispersion-applied sheet, and laminating a porous material and said dispersion-applied surface.

5. The process according to claim 1, wherein said hydrophobic inorganic fine particles comprise a member selected from the group consisting of silica, alumina and titania, the particles having surfaces combined with a hydrophobic group for increasing the hydrophobicity of the surfaces.

6. The process according to claim 1, wherein said hydrophobic inorganic fine particles have an average particle diameter of 10 μm or less.

7. The process according to claim 1, wherein said hydrophobic inorganic fine particles have an average particle diameter of 7 nm to 3 μm.

8. The process according to claim 1, wherein said hydrophobic inorganic fine particles are dispersed in an amount of 1–500 wt % relative to the amount of isocyanate radical in the polyfunctional isocyanate compound.

9. The process according to claim 8, wherein said hydrophobic inorganic fine particles are dispersed in an amount of 5–300 wt % relative to the amount of isocyanate radical in the polyfunctional isocyanate compound.

10. The process according to claim 1, wherein said hydrophobic inorganic fine particles are dispersed in an amount of 0.01–100 wt % relative to the amount of the polyfunctional isocyanate compound.

11. The process according to claim 10, wherein said hydrophobic inorganic fine particles are dispersed in an amount of 0.01–60 wt % relative to the amount of the polyfunctional isocyante compound.

12. The process according to claim 1, wherein the polyfunctional isocyanate compound is selected from the group consisting of tolylene diisocyanate, diphenylmethane diisocyanate, tolidine diisocyanate, xylidine diisocyanate, hexamethylene diisocyanate, trimethylolpropane-tolylene diisocyanate adduct, polyfunctional aromatic polyisocyanate, polymethylene polyphenyl isocyanate, and partially modified compounds thereof.

13. The process according to claim 1, wherein the polyfunctional isocyanate compound is present in an amount of 0.01–40 parts by weight to 100 parts by weight of the pressure sensitive adhesive agent.

14. The process according to claim 13, wherein the polyfunctional isocyanate compound is present in an amount of 0.01–25 parts by weight to 100 parts by weight of the pressure sensitive adhesive agent.

15. The process according to claim 1, wherein:

(a) for a dispersion containing a natural rubber pressure sensitive adhesive agent or synthetic rubber pressure sensitive adhesive agent, the water is dispersed in an amount of 5–60 parts by weight to 100 parts by weight of an organic solvent solution of the natural rubber pressure sensitive adhesive agent or the synthetic rubber pressure sensitive adhesive agent; and (b) for a dispersion containing an acrylic pressure sensitive agent, the water is dispersed in an amount of 5–50 parts by weight to 100 parts by weight of an organic solvent solution of the acrylic pressure sensitive adhesive agent.

16. The process according to claim 15, wherein:

(a) for a dispersion containing a natural rubber pressure sensitive adhesive agent or synthetic rubber pressure sensitive adhesive agent, the water is dispersed in an amount of 10–50 parts by weight to 100 parts by weight of an organic solvent solution of natural rubber pressure sensitive adhesive agent or synthetic rubber pressure sensitive adhesive agent; and (b) for a dispersion containing an acrylic pressure sensitive agent, the water is dispersed in an amount of 5–40 parts by weight to 100 parts by weight of an organic solvent solution of the acrylic pressure sensitive adhesive agent.

17. The process according to claim 1, wherein the organic solvent comprises a hydrophobic organic solvent selected from the group consisting of ethyl acetate, benzene, toluene, xylene, hexane, mineral oil, petroleum oil, and mixtures thereof.

18. The process according to claim 1, wherein the porous material is selected from the group consisting of cellulosic paper, woven or non-woven fabric, rough-mesh polymer and polymer foam.

19. The process according to claim 1, wherein a water absorptive high-molecular weight compound is dispersed in the organic solvent solution.

20. The process according to claim 19, wherein the water absorptive high-molecular weight compound has a particle size of less than 60 μm.

21. The process according to claim 20, wherein the water absorptive high-molecular weight compound has a particle size of less than 40 μm.

22. The process according to claim 5, wherein said hydrophobic group for increasing the hydrophobicity of the surfaces comprises a hydrocarbon group, a silicon-compound residue or a fluorine-compound residue.

* * * * *